United States Patent [19]

Grant

[11] 4,453,402
[45] Jun. 12, 1984

[54] METHOD AND APPARATUS FOR DETERMINING THE POSITION OF A PISTON IN THE CYLINDER OF A RECIPROCATING ENGINE

[76] Inventor: David Grant, Langdale, Moor La., South Newington, Nr. Banbury, Oxon, England

[21] Appl. No.: 367,599

[22] Filed: Apr. 12, 1982

[30] Foreign Application Priority Data

Mar. 10, 1982 [GB] United Kingdom ............... 8207012

[51] Int. Cl.³ ........................................ G01M 15/00
[52] U.S. Cl. ............................................. 73/117.2
[58] Field of Search .................. 73/116, 117.2, 119 R; 324/172

[56] References Cited

U.S. PATENT DOCUMENTS 4,292,670  9/1981  Reid et al. ..................... 73/116 X
4,337,647  7/1982  Radcliffe et al. ................. 73/116
4,348,893  9/1982  Hendrix et al. .................. 73/116

Primary Examiner—Jerry W. Myracle
Attorney, Agent, or Firm—Shapiro and Shapiro

[57] ABSTRACT

The normal procedure for determining top-dead-center (T.D.C.) of a reciprocating engine involves slowly rotating the crankshaft of the engine until the maximum uppermost position (T.D.C.) of the piston in the cylinder has been attained and then inserting a linear gauge in the cylinder to make an appropriate measurement of this position. This method requires access to the piston crown and necessitates the disturbance of cylinder head components. The procedure disclosed obviates the deficiencies of the prior art by determining piston position from measurements taken externally of the engine, in particular by monitoring the speed of the engine, preferably using the flywheel of the engine, on a freely decelerating engine in a non-firing mode. The successive minimum speeds attained by the flywheel during a reciprocating cycle correspond to the two opposite extremities of movement of the piston in the cylinder of interest and thus accurate determination of T.D.C. and/or B.D.C. conditions is possible.

10 Claims, 2 Drawing Figures

METHOD AND APPARATUS FOR DETERMINING THE POSITION OF A PISTON IN THE CYLINDER OF A RECIPROCATING ENGINE

FIELD OF THE INVENTION

The present invention relates to a method and apparatus for determining the position of a piston in the cylinder of a reciprocating engine, in particular the point of minimum cylinder volume called the top dead centre hereinafter referred to as T.D.C.

BACKGROUND ART

The knowledge of the T.D.C. position in a reciprocating engine is of prime importance in the setting of engine timing conditions. It is generally determined by inserting a linear position gauge in a respective cylinder in a non-firing mode of the engine and slowly rotating the crankshaft until the piston reaches its uppermost limit in the cylinder corresponding to T.D.C. To enable the gauge to be inserted in the cylinder, access has to be provided to the piston crown and this entails removal of cylinder head components. This known procedure is costly and time-consuming.

SUMMARY OF THE INVENTION

The purpose of the present invention therefore is to provide means whereby the T.D.C. of a reciprocating engine (or any other piston position) can be determined in a simple but highly accurate manner, that is without the necessity of disturbing the cylinder head in order to take direct measurements by intrusion into the combustion chamber of the engine.

Now the speed of revolution of the crankshaft of a reciprocating engine in the non-firing mode varies according to the position of the piston of interest in a respective cylinder of the engine. The force components contributing to this rotational speed are due to unbalanced inertial forces and superimposed cylinder compression effects. Moreover in a particular reciprocating cycle the piston expends energy during the compression stroke and thus decelerates before T.D.C., whilst the expansion stroke causes acceleration of the piston subsequent to T.D.C.

Thus in a single cylinder engine for example, the minimum angular speed of rotation of the crankshaft in a given reciprocating cycle corresponds to T.D.C. and B.D.C. (Bottom Dead Center) and conversely the maximum speed corresponds to the mid-piston position.

It would appear therefore that it should be possible to determine a T.D.C. condition by simply monitoring the rotational speed of the crankshaft as the engine is motored in the non-firing mode at constant speed, for example by employing a starter motor to operate on the flywheel ring gear teeth of the engine.

However employing such a technique in actual practice does not give accurate results because typically it has been found that minimum rotational speed of the flywheel occurs three to four degrees after T.D.C. at a constant speed of rotation of 300 to 400 rpm in the non-firing mode.

This is due to the fact that the particular device used to effect motoring of the engine at a constant speed in the non-firing mode e.g. a D.C. starter motor as mentioned above, induces an out-of-phase acceleration component in the crankshaft leading to the stated lag between the achievement of top dead centre and a minimum speed condition.

To compensate for this distortion a speed dependent compensation factor must be applied at the points of maximum and minimum crankshaft rotational speeds which therefore unnecessarily complicates the procedure.

This problem is overcome due to the present invention by taking appropriate measurements on a freely decelerating engine in the non-firing mode at low speed.

According to the invention there is provided a method of determining the top dead center position of a piston in a cylinder of a reciprocating engine comprising allowing the engine to decelerate to rest in a non-firing mode of the engine, measuring the speed of the engine during deceleration, and determining the speed minimum in a final reciprocating movement of the piston before the engine comes to rest, said speed minimum corresponding to the top dead center position of the piston in the cylinder.

The advantage of this method is that since the engine is decelerating freely in the non-firing mode the distortional effects due to externally applied forces necessary to motor the engine at constant speed are eliminated and the speed mimina attained by the engine during run down then correspond precisely to top dead centre position.

Advantageously the speed of rotation of the crankshaft is measured to determine deceleration, preferably by monitoring the variation in speed of movement of markers on means rotating with the crankshaft passing a given detecting point.

The markers are preferably consecutive teeth on the flywheel of the engine thus providing a readily accessible and usable means for monitoring constantly the speed of revolution of the crankshaft by simply counting the number of teeth passing the detecting point over a period of time. Since the number of teeth on the flywheel is a known quantity, the variation in crankshaft speed, and hence a maximum and minimum speed in a given cycle, can be calculated in any suitable way and the rotational position of the flywheel at the maximum and minimum speeds (and any intermediate speed) determined with reference to the detecting point.

When applying the invention to a multi-cylinder reciprocating engine then of course it becomes necessary to know to which cylinder or piston, any particular speed condition of monitored flywheel rotational speed, relates, in order that T.D.C. of that piston can be determined.

Advantageously this is carried out by finding an angular position of the flywheel with reference to the given detecting point corresponding approximately to a measurable cyclic event in the cylinder of interest in a firing-mode of the engine.

Thus an approximate T.D.C. condition for example in a petrol engine corresponds to spark ignition, and in a diesel engine to the instant of positive fuel injection registering as a pulse effect in the fuel line, both these cyclic events being determinable relative to flywheel speed in terms of flywheel angular position.

Once this approximate datum position has been established then it is possible to relate any subsequent minimum speed condition for example, of the flywheel monitored during free deceleration in the non-firing mode, to the cylinder of interest, because clearly a minimum speed condition of the flywheel during rundown which occurs closest to the datum position approximating T.D.C., will be the minimum speed condition relating to that cylinder. Thus only this minimum speed condition in a given cycle need be recorded, while other maximum and minimum readings, relating to other pistons in the engine, ignored.

Other features and advantages of the present invention will become apparent from the description that follows.

BRIEF DESCRIPTION OF THE DRAWINGS

Embodiments of the present invention will now be described by way of example with reference to the accompanying drawings wherein:

FIG. 1 is a schematic illustration of a system for determining the position of a piston in the cylinder of a reciprocating engine; while

BEST MODES OF CARRYING OUT THE INVENTION

Figure 1:
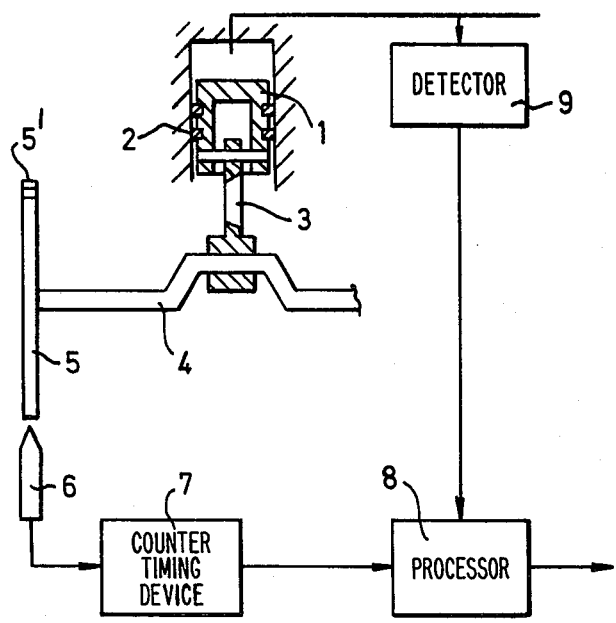

With reference to FIG. 1 a piston 1 of a multi-cylinder reciprocating engine, is shown travelling in a cylinder 2. The piston 1 is attached by a connecting rod 3 to a crankshaft 4 bearing a flywheel 5 in the normal manner.

A detector 6 is positioned adjacent the flywheel 4 for detecting the passage of teeth 5' on the flywheel 5 as the crankshaft rotates.

A counter-timing device 7 is connected to the detector 6 and is responsive to signals fed thereto from the detector 6 to measure the elapsed time between the passage of adjacent teeth passing the detector 6.

The counter-timing device 7 provides representative output timing signals which are then fed to a programmable signal processor 8. The processor 8 determines the angular speed of the flywheel 5 at any given time and the corresponding angular position of the flywheel 5 (or crankshaft), the angular position being determined in terms of the number of teeth counted by the counter-timer 7, which have passed the detector 6 before the desired speed condition occurs.

A detector 9 is coupled between the cylinder of interest 2 and the signal processor 8. The detector 9 determines a cyclic event in the cylinder 2 corresponding to a particular position of the piston 1, and provides a representative output signal to the processor 8.

Thus with detector 6 working with detector 9, the angular position of the flywheel 5 at which the representative cyclic event occurs, can be determined and is stored in processor 8 to provide a reference or datum point for the cylinder of interest.

When operating the system of the invention, therefore, to determine a T.D.C. condition, a relevant cyclic event is conveniently or preferably taken to be spark ignition in the case of a petrol engine, and the time of fuel injection in a diesel engine during the firing-mode of the engines.

Such cyclic events approximate T.D.C. conditions and therefore provide means for referencing the cylinder of interest prior to accurate determination of T.D.C. in that cylinder.

As the engine is subsequently "killed" and allowed to freely decelerate to rest, the processor 8 will only lock onto signals coming from counter-timer 7 corresponding to the cylinder of interest (or is able to differentiate the signals from cylinder to cylinder) since those minimum speeds closest to the pre-established reference or datum points will be processed, or distinguished one from the other if the various cylinders of the engine are being monitored simultaneously for T.D.C. conditions.

Of course it will be appreciated that if the system is applied to a single cylinder engine, the detector 9 will not be necessary.

Figure 2:
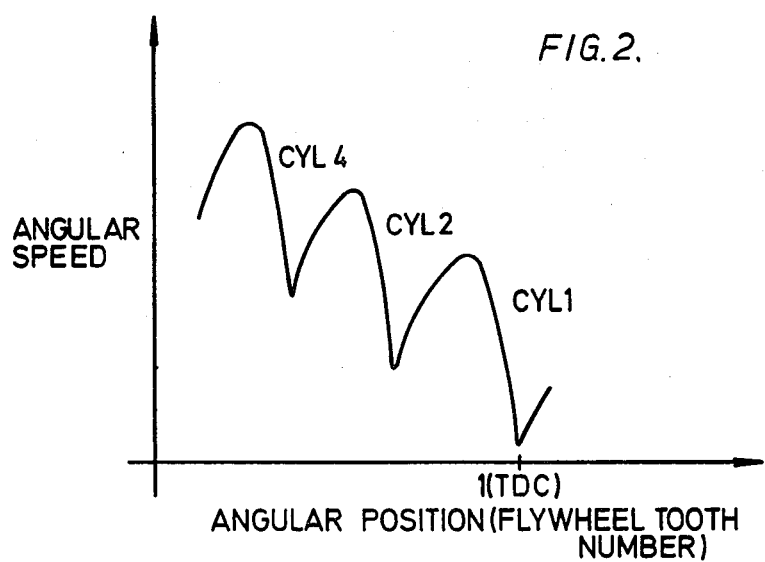
FIG. 2 is a graph of the waveform of angular speed of a crankshaft against angular position with reference to a given detecting point determined using the system of FIG. 1.

A typical waveform obtained from a multi-cylinder engine using the system as above described is shown in FIG. 2, and depicts flywheel angular speed variations against flywheel angular position (i.e. tooth number referenced from the detecting position provided by the detector 6).

Each successive minimum point on the curve corresponds to T.D.C. conditions in the cylinders in the firing sequence as shown.

Thus the T.D.C. condition for reference cylinder of interest 1 is, in the example shown, taken to be that angular position of the flywheel corresponding to the minimum speed of the flywheel attained just prior to the engine finally coming to rest, namely point 1 (T.D.C.) on the abcissa of the graph.

Similarly, as the example waveform shows in FIG. 2, the and T.D.C. conditions for cylinders 2 and 4 are at the minimum point on the speed curves obtained for these cylinders.

The simplicity of the system as described compared with the prior art, will be apparent, and lends itself to use either by engine manufacturers, in the garage workshop, or by automobile owners desirous of carrying out such tests themselves.

Variations in the component parts of the apparatus used to perform the invention, as described, and the method of performing the steps involved, will be apparent to those skilled in the art. For example, it is not essential that the flywheel of the engine be used to determine crankshaft speed. As an alternative, gears driven by the crankshaft or camshaft would provide appropriate reference markers. Also surface velocity sensors would provide equivalent data to the incremental timer provided by detector 6 and counter-timer 8.

I claim:

1. A method of determining the top dead center position of a piston in the cylinder of a reciprocating engine comprising allowing the engine to decelerate to rest in a non-firing mode of the engine, measuring the speed of the engine during deceleration, and determining the speed minimum in a final reciprocating movement of the piston before the engine comes to rest, said speed minimum corresponding to the top dead center position of the piston in the cylinder.

2. A method as claimed in claim 1 wherein the speed of the engine is determined by monitoring the speed of rotation of the crankshaft of the engine.

3. A method as claimed in claim 2 wherein said speed minimum is determined by obtaining a waveform comprised of successive maximum and minimum values representing the highest and lowest rotational speeds of the crankshaft as the engine decelerates to rest and corresponding to the bottom and top dead center positions of the piston in the cylinder respectively, said speed minimum being that minimum in the final cycle of the waveform corresponding to that piston, before the engine comes to rest.

4. A method as claimed in claim 2 or 3 wherein the speed of rotation of the crankshaft is measured by determining the speed of movement of adjacent teeth on a flywheel of the engine passing a given detecting point.

5. A method as claimed in claim 4 wherein the teeth of the flywheel are monitored to determine the position of a respective tooth with reference to a datum tooth position, corresponding to a paticular angular speed of the flywheel.

6. A method as claimed in claim 1 wherein a component associated with a cyclic event of the engine is monitored to provide reference identification of the cylinder of interest, in a multi-cylinder reciprocating engine, to which said measured deceleration relates during run down in the non-firing mode.

7. A method as claimed in claim 6 wherein said cyclic event is spark ignition in a firing mode of a petrol engine.

8. A method as claimed in claim 6 wherein said cyclic event is the point of fuel injection in a firing mode of a diesel engine.

9. Apparatus for determining the top dead center position of a piston in the cylinder of a reciprocating engine comprising detecting means for detecting the speed of the engine during run down in a non-firing mode, and processor means responsive to signals from said detecting means for determining the speed minimum in a final reciprocating movement of the piston before the engine comes to rest, said speed minimum corresponding to the top dead center position of the piston in the cylinder.

10. Apparatus as claimed in claim 9 comprising further detecting means for providing signals for storage in said processor means representative of a component associated with a cyclic event of the engine during the firing mode thereof, thereby to provide reference identification in the processor means of the cylinder of interest, in a multi-cylinder engine, to which the signals from said first-mentioned detecting means relate.

* * * * *